United States Patent
Chang et al.

(10) Patent No.: US 7,418,615 B2
(45) Date of Patent: Aug. 26, 2008

(54) UNIVERSAL TIMEOUT MECHANISM

(75) Inventors: Nai-Chih Chang, Shrewsbury, MA (US); Pak-Iung Seto, Shrewsbury, MA (US); Victor Lau, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 11/237,448

(22) Filed: Sep. 27, 2005

(65) Prior Publication Data

US 2007/0074062 A1    Mar. 29, 2007

(51) Int. Cl.
*G06F 1/14* (2006.01)
*G06F 1/12* (2006.01)
*G06F 9/44* (2006.01)

(52) U.S. Cl. ............... 713/502; 713/400; 719/318

(58) Field of Classification Search .......... 713/502, 713/400

See application file for complete search history.

(56) References Cited

U.S. PATENT DOCUMENTS

| 7,000,150 | B1* | 2/2006 | Zunino et al. | 714/38 |
| 7,047,533 | B2* | 5/2006 | Circenis | 719/318 |
| 2003/0051062 | A1* | 3/2003 | Circenis | 709/310 |
| 2005/0268136 | A1* | 12/2005 | Kostadinov et al. | 713/400 |

* cited by examiner

*Primary Examiner*—Suresh K Suryawanshi
(74) *Attorney, Agent, or Firm*—Christopher K. Gagne; Caroline M. Fleming

(57) ABSTRACT

According to one embodiment, a system is disclosed. The system includes a central timeout manager (CTM) to receive timeout events from two or more clients and a search unit to search for a location in a list of timeout events to place a new received timeout event.

21 Claims, 8 Drawing Sheets

UNIVERSAL TIMEOUT MECHANISM

FIELD

This disclosure relates to computer systems; more particularly, this disclosure relates to computer system interaction with hard disk drives.

BACKGROUND

Timeout requirements have been added to improve overall protocol efficiency or detect error conditions in many fields including storage, communication, networking, etc. For example, there are many timeouts defined in serial SCSI (SAS) protocol such as COMSAS/COMINIT timeout in OOB sequence, ALIGN timeout, Identify timeout, ACK/NAK timeout, Done timeout, Break timeout, DWS Reset timeout, Credit timeout, Open/Close timeout, and many more. Certain timeouts have specific timeout values, for instance, ACK/NAK timeout value is 1 millisecond, COMSAS detect timeout minimum requires 1365 us, etc. Some timeout requirements are in the link and phy layers, while some timeouts are required in transport layer.

In addition to the protocol specific timeouts, there is another important timeout, input/output (I/O) timeout, defined and used to track the overall latency of an entire IO and usually it's tracked by application layer or software/firmware. IO timeout timer usually starts on processing new IO and ends on receiving final response of that IO.

Typical timeout implementations define those timeout counters across all different layers, and each functional block has its own set of timeout counters. For example, the link layer may define a millisecond (ms) counter for those ms second timeouts such as ACK/NAK timeout, RRDY timeout, etc. and one counter for OOB related timeouts which usually phy layer handles most of the tasks and so on. Moreover, those counters may be duplicated in each lane to track their own timeout events which may be less optimal in terms of gate count. Implementing so many timeout applications in a platform results in a complex design, especially when the design supports multiple different storage protocols such as SAS, STP, SMP, SATA, or Fibre Channel.

BRIEF DESCRIPTION OF THE DRAWINGS

Embodiments of the invention are illustrated by way of example and not limitation in the figures of the accompanying drawings, in which like references indicate similar elements, and in which.

DETAILED DESCRIPTION

A Universal Timeout Mechanism is described. In the following detailed description numerous specific details are set forth in order to provide a thorough understanding. However, it will be apparent to one skilled in the art that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
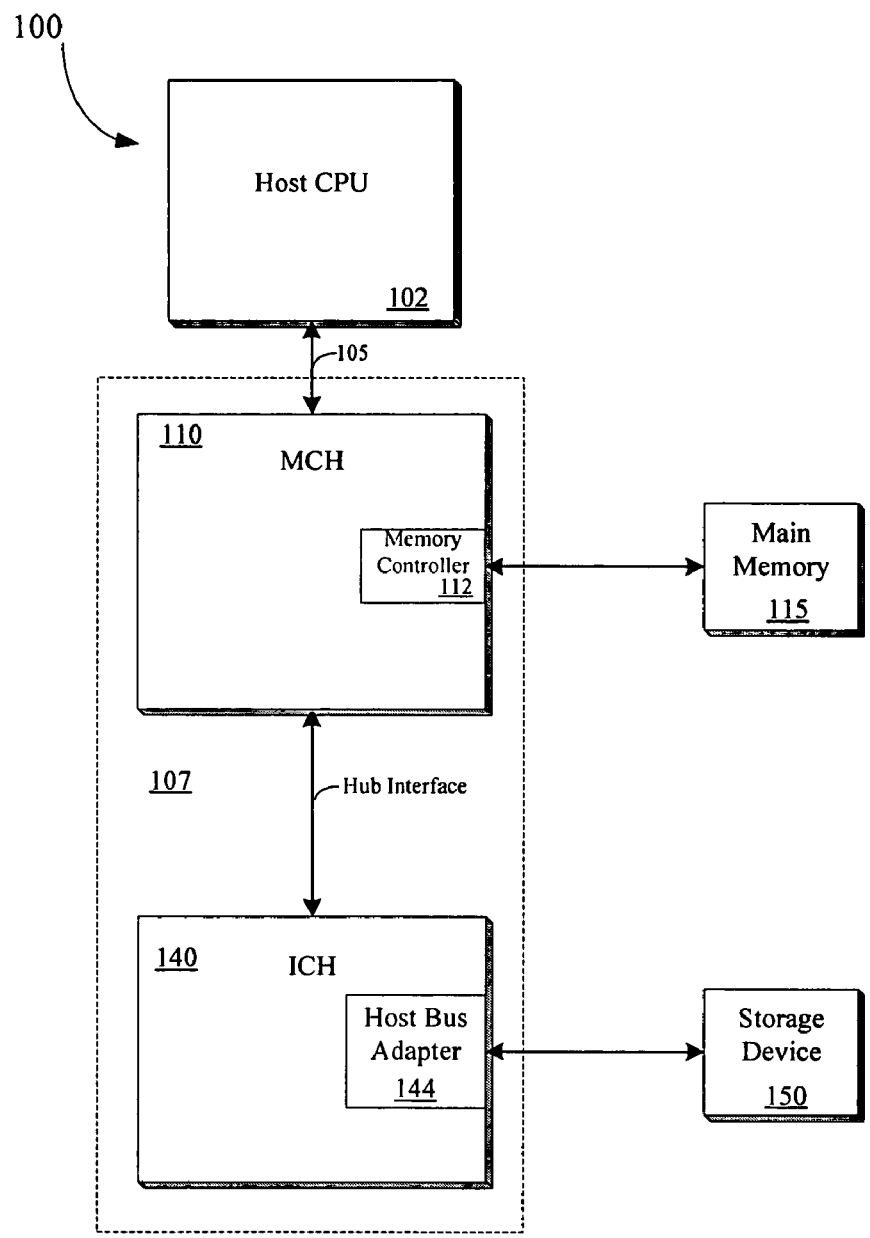
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard disk drives 150. In such an embodiment, HBA 144 operates as a serial attached SCSI (SAS) device coupled to one or more additional SAS devices. In a further embodiment, storage device 150 is a serial SCSI (SSP) drive. However in other embodiments, storage devices 150 may be implemented as other drives with serial interface protocols.

Figure 2:
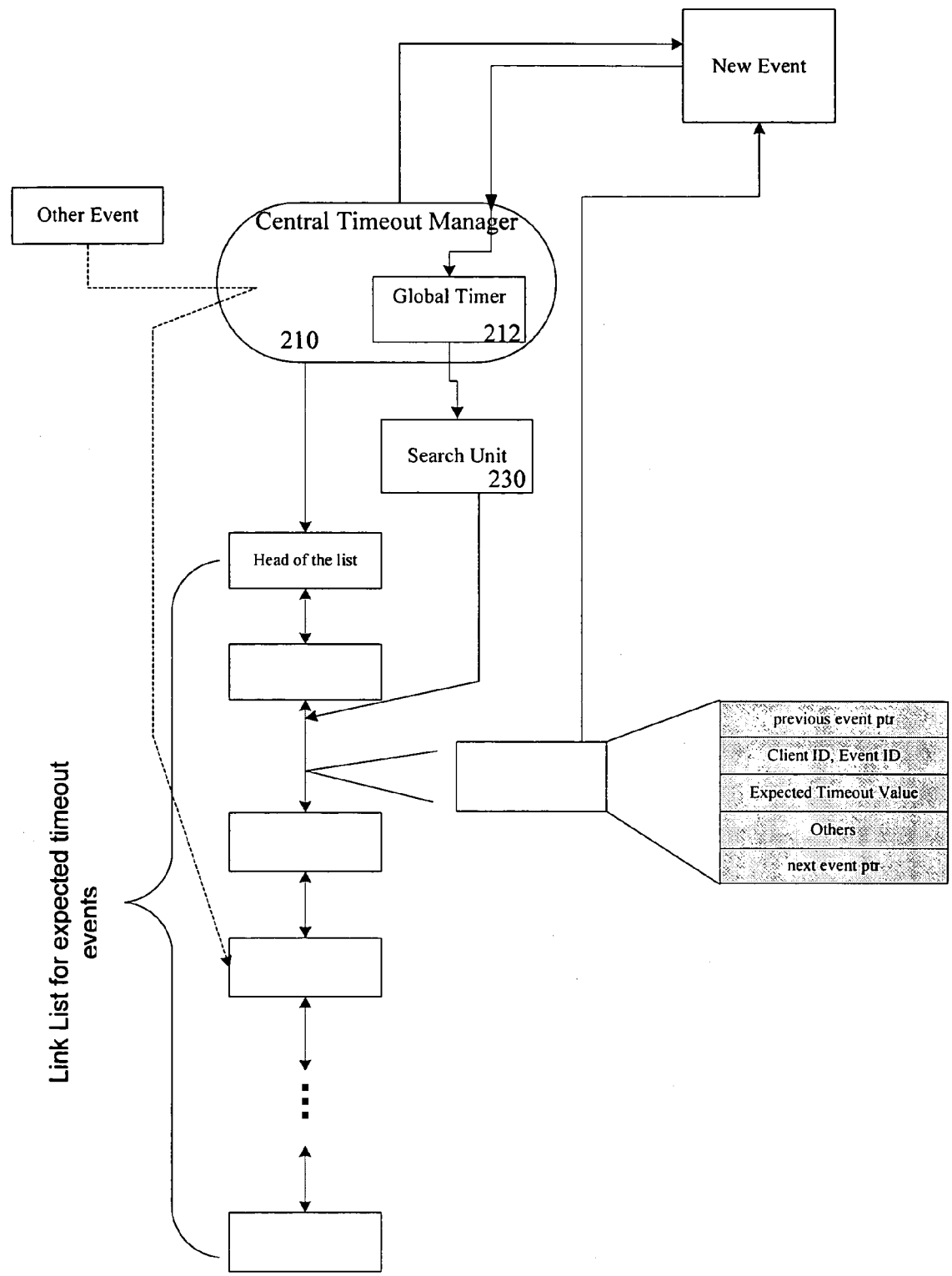
FIG. 2 illustrates one embodiment of a Universal Timeout Mechanism.

According to one embodiment, HBA 144 includes a mechanism to manage all different timeouts in a universal fashion via a link list. FIG. 2 illustrates a diagram of one embodiment of HBA 144 implementing a Universal Timeout Mechanism. Although described with reference to a HBA, one of ordinary skill in the art will appreciate that the timeout mechanism described herein may apply to other storage devices, as well as devices in other fields having timeout requirements (e.g., communication, networking, etc.).

Referring to FIG. 2, HBA 144 includes a central timeout manager 210 and a search unit 230 receives timeout events from various applications (clients) in the SAS protocol. In one embodiment, such events include a request, a client ID indicating the client for which a timeout is to occur, an event ID and an absolute timeout value. Further, central timeout manager 210 includes a global timer 212 that operates as a comprehensive timer for HBA 144.

Search unit 230 searches for a location in a link list of expected timeout events to place the new event. In one embodiment, when a client is to start a timeout counter due to a new event, the client makes a request to central timeout manager 210 along with the client ID, event ID and the timeout value. Subsequently, central timeout manager 210 adds the absolute timeout value to a free running global time value and produces a sum which is the expected timeout value. Although described with respect to a linked list, search unit 230 may search for events stored in other types of data structures (e.g., binary tree) in order to place a new event in the structure.

Search unit 230 uses the sum to search in the link list to find out relative order (the expected timeout value) within the list for the new event. Once search unit 230 finds where to search the event, it inserts the new event into the link list. Next, an acknowledgement is sent back to the client with the timeout ID. When the expected timeout value of the 'head' of the link list meets the value from the free running counter, a timeout occurs. As a result, only the event at the 'head' of the link list is to be monitored since the to-be-timeout events are ordered in the list.

Once the timeout occurs, central timeout manager 210 reports the timeout to the client via the recorded client ID. Central timeout manager 210 then removes the event from the link list. When a task or an event is completed before its associated timeout happens, the client removes the event from the link list through central timeout manager 210 via the acquired timeout ID, which may include port number (or lane number), functional block number, etc.

Figure 3:
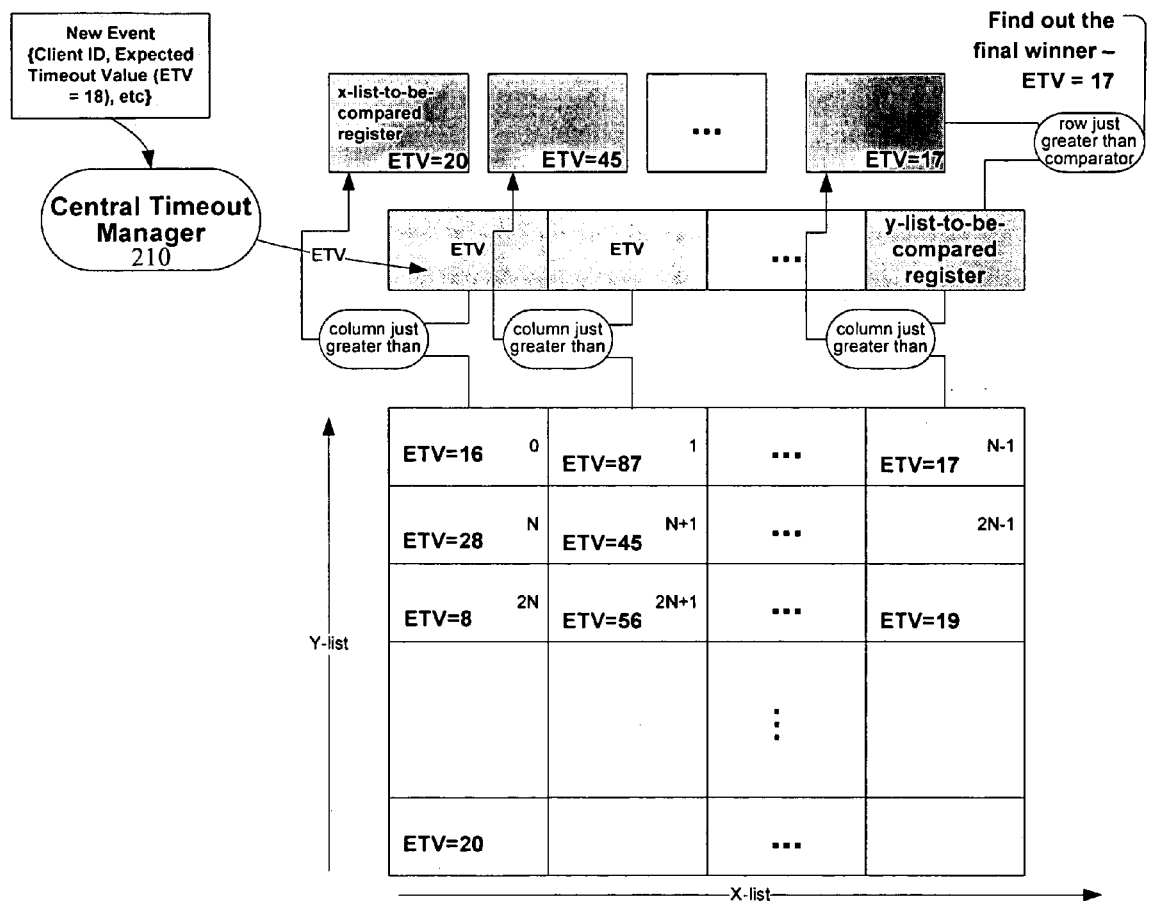
FIG. 3 illustrates a further embodiment of a search mechanism.

According to one embodiment, search unit 230 implements a search algorithm that supports a large number of expected timeout events in order to reduce the amount of time needed to search a relatively long list. FIG. 3 is a block diagram illustrating one embodiment for carrying out the search mechanism, where a storage element stores the timeout events in a 2-dimensional list (e.g., x and y list).

In such an embodiment, each occupied cell in storage includes an expected timeout event. All of the expected timeout events are linked as described with reference to FIG. 2. Whenever a new event request is received at central timeout manager 210, central timeout manager 210 copies the expected timeout value of the new event to a to-be-compared register associated with each column of the 2-dimensional list According to one embodiment, each column (the y-dimension) has a 'Just Greater Than' (JGT) comparator. The column JGT comparator then uses a bit finding mechanism to find out the valid expected timeout event whose expected timeout value is the closest and "just greater than" the new event's value.

Figure 4:
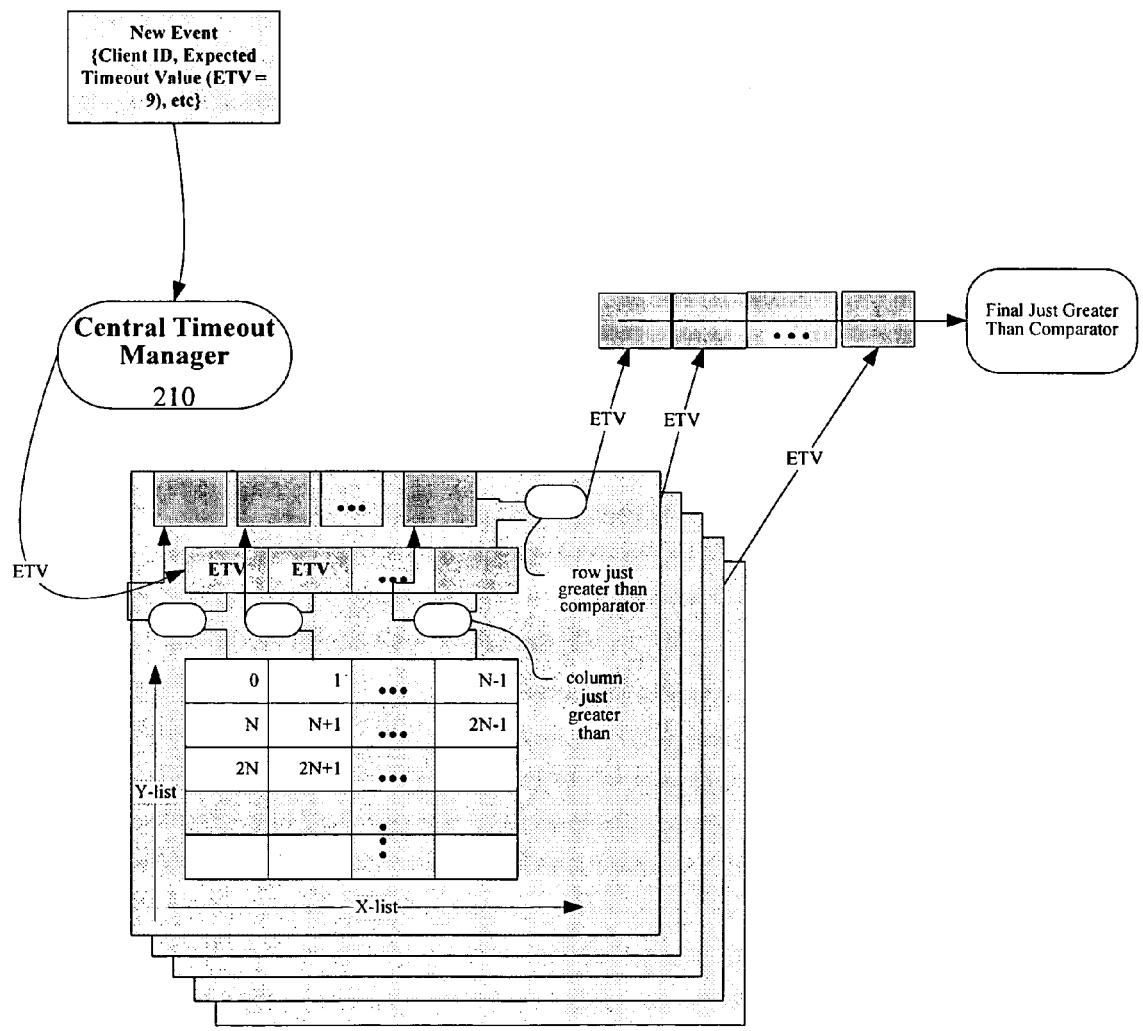
FIG. 4 illustrates another embodiment of a search mechanism.

The column JGT comparator subsequently copies the value it found to the 'x-list-to-be-compared' register. Once all of the 'x-list-to-be-compared' registers are filled or masked, the 'row-just-greater-than' comparator use the bit finding mechanism to find a value with the closest expected timeout value and the 'just greater than' the new event's value from the entire list or storage. Note that, if the x-list is too long, the x-list can be separated into several sections and create a second or more level comparison as shown in FIG. 4.

Figure 5:
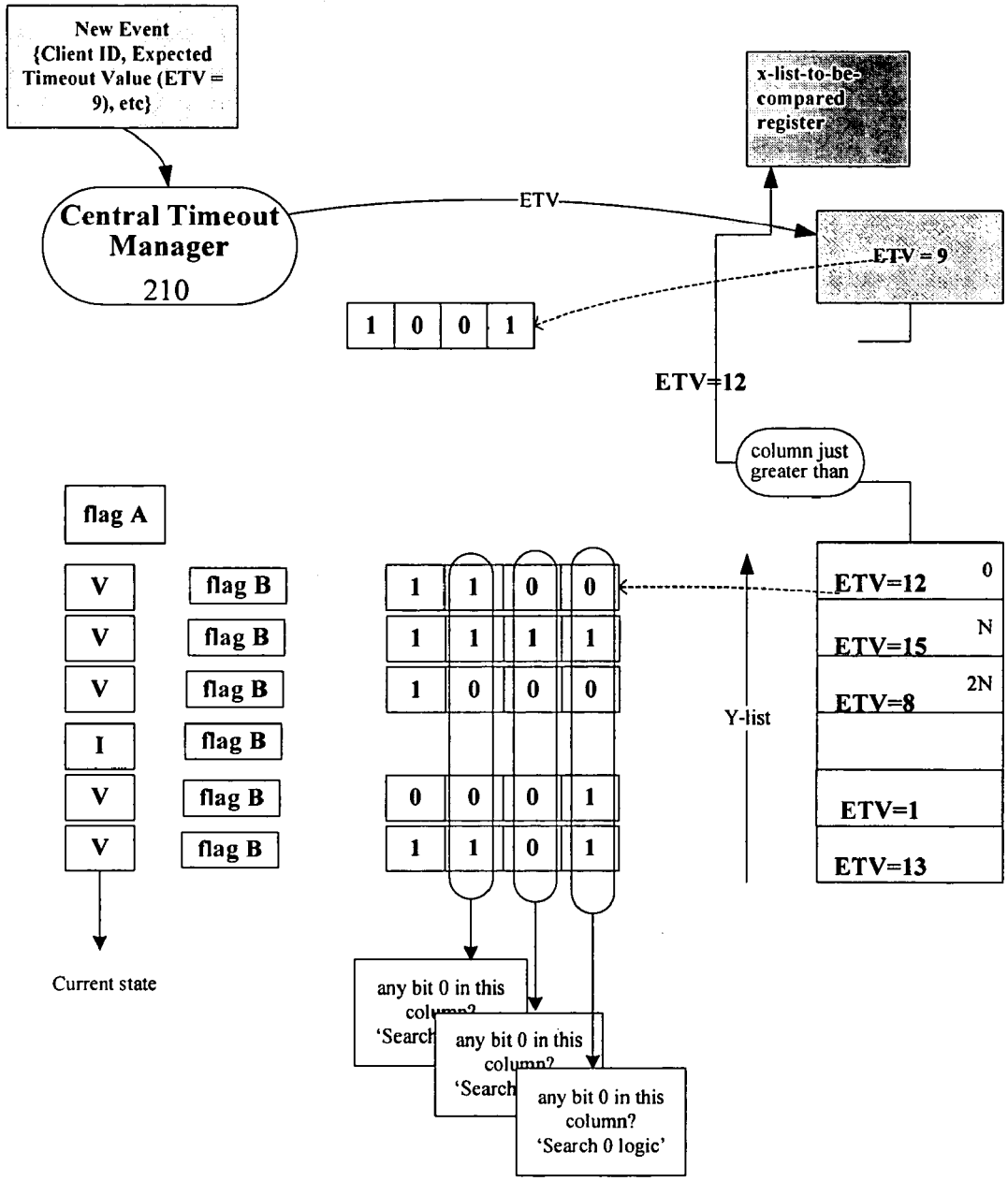
FIG. 5 illustrates one embodiment of a bit finding mechanism.

FIG. 5 illustrates one embodiment of a finding mechanism implemented in the search mechanism described above. According to one embodiment, the mechanism defines 3 states—Invalid (I), Equal to (E), and Greater than (G). The comparison starts from the most significant bit towards the least significant bit. The followings show basic functions:

There is a 'G-state-0-search logic' per column bit from column MSB-1 to column 0. The G-state-0-search logic searches 0 in the vertical bit column.

There is a 'flag A' defined to track state transition of E to G. The flag A will be cleared either there is no E-to-G state transition or at the end of search process.

There is a 'flag B' per entry of the list. The flag B is set when the corresponding entry state transition from E to G. The flag B will be self-cleared on the next clock cycle since the E-to-G state transition can only happen once.

The followings are legal state transitions:

| Current State | Next State | Description | Notes |
|---|---|---|---|
| I (Invalid) Default state upon starting comparison | I | When the corresponding bit value in the list is less than the new event's corresponding bit value in the list. | |
| | E | When the corresponding bit value in the list equals to the new event's corresponding bit value in the list. | |
| | G | When the corresponding bit value in the list is greater than the new event's corresponding bit value in the list. | |
| E (Equal) | I | When the corresponding bit value in the list is less than the new event's corresponding bit value in the list. | |
| | E | When the corresponding bit value in the list equals to the new event's corresponding bit value in the list. | |
| | G | When the corresponding bit value in the list is greater than the new event's corresponding bit value in the list. | This transition shall set flag A.N in the corresponding list to invalidate all other G states. It shall also set a flag B in the corresponding entry. |
| G | I | If flag A is set and its corresponding flag B is not set, then this transition will be true. | |
| | I | If the 'search 0' is asserted and the corresponding bit value in the list is '1', then this entry becomes invalid. | |
| | G | If the 'search 0' is asserted and the corresponding bit value in the list is '0', then this entry stays at G state. | |

| Current State | Next State | Description | Notes |
| --- | --- | --- | --- |
| | G | If the 'search 0' is not asserted, then this entry stays at G state. | |

Figure 6:
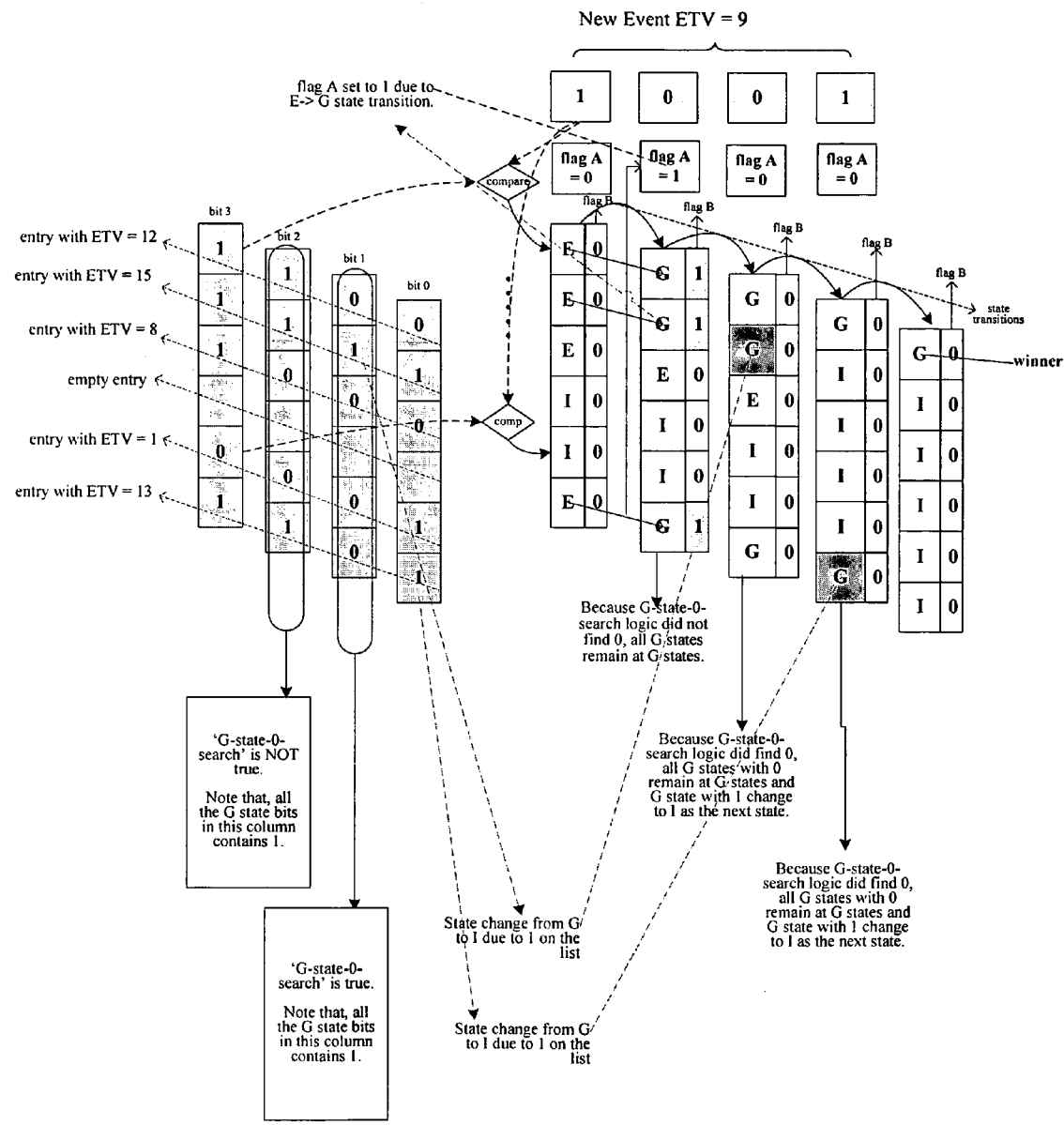
FIG. 6 illustrates a further embodiment of a bit finding mechanism.

FIG. 6 illustrates a further embodiment of the bit finding mechanism. When most significant bits (MSBs (bit 3)) in the list are equal to the new event's MSB, the states change to E. When the MSBs are less, the states change from I. When either bit 2 or bit 1 in the list are greater than the new event's corresponding bit, the state change from E to G. Note that, when the bit value of G state in the list is 0, G stays at G. When the bit value of G state in the list is 1 and the 'G-state-0-search' logic finds 0, this bit's state change from G to I. When the bit value of G state in the list is 1 and the 'G-state-0-search' logic does not find 0, the bit's state remains at G state.

Figure 7:
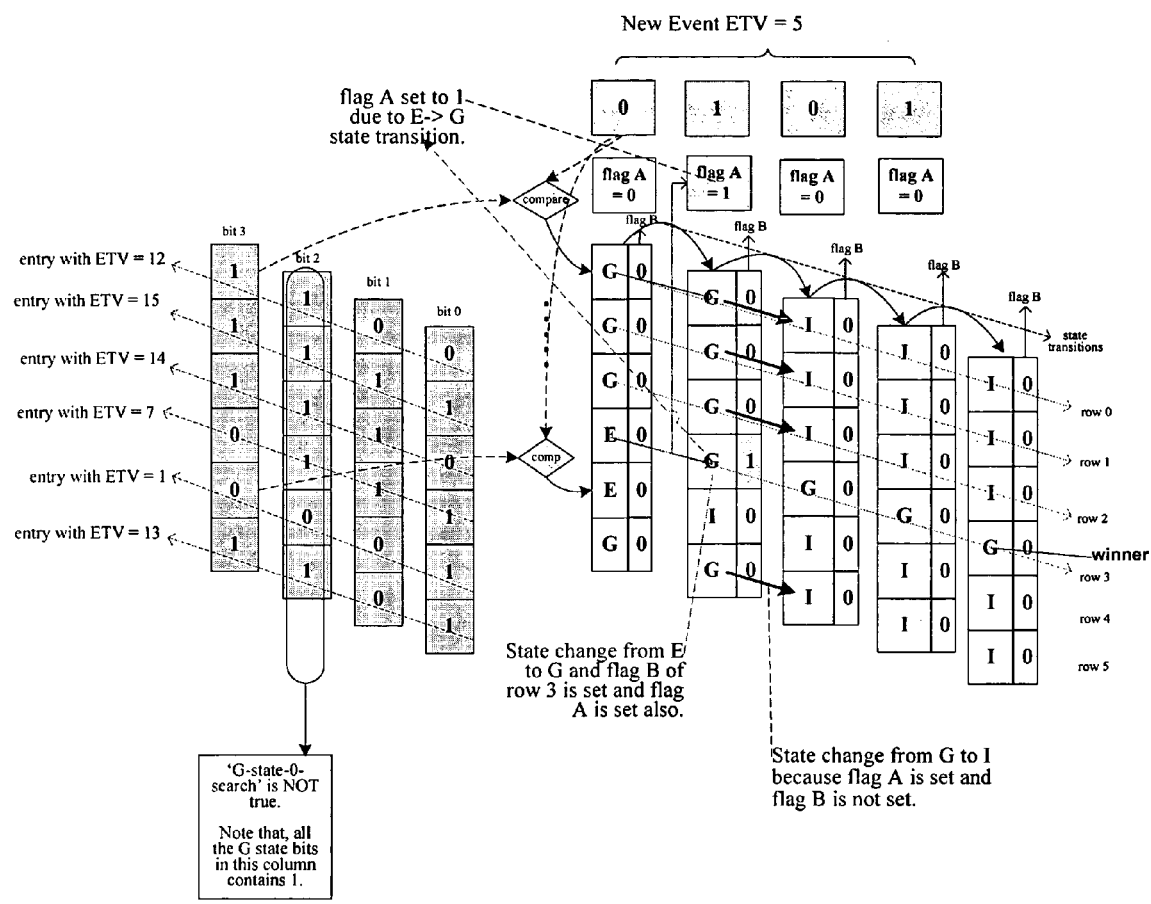
FIG. 7 illustrates another embodiment of a bit finding mechanism.

FIG. 7 illustrates another embodiment of the bit finding mechanism. When there is any state transition from E to G, the corresponding column flag A will be set and the corresponding row flag B will be set as well. Once flag A is set but the corresponding row's flag B is not set, all the G state in that column will change to I state.

Figure 8:
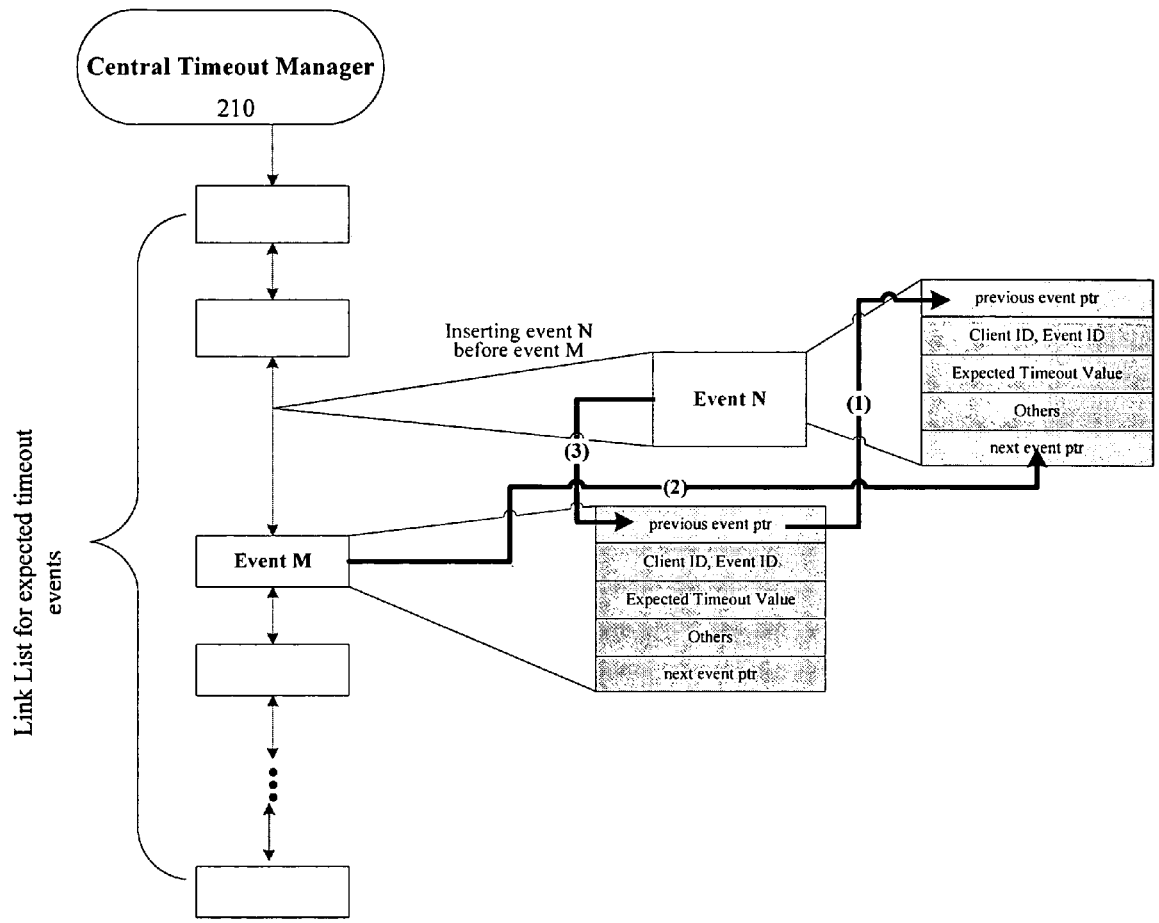
FIG. 8 illustrates a further embodiment of a Universal Timeout Mechanism.

Once the final 'just greater than' event (event M) is selected from the 'row-just-greater-than' comparator, the new event (say event N) is to be inserted into the list. To do this, first, event M's 'previous event pointer' is copied. FIG. 8 illustrates one embodiment of copying a 'previous event pointer' to event N's 'previous event pointer' field. Subsequently, event M's storage ID is filled into event N's 'next event pointer' and event N's storage ID is filled into event M's 'next event pointer'. Therefore, the event insertion is completed. Note that, if the new event's 'expected timeout value' (ETV) is greater than any one in the list, then we insert this new event into the bottom of the link list.

In a further embodiment, the un-stitching process is just a reverse to the stitching process described above, where the 'next event pointer' of the to-be-removed event is copied to the 'next event pointer' of the event linked by the 'previous event pointer'. Next, the 'previous event pointer' of the to-be-remove event is copied to the 'previous event pointer' of the event linked by the 'next event pointer'.

Finally, if the new event expected timeout value is the same as one of the event stored in the list, a 3-dimension list (or a special list) may be generated to link those events of the same expected timeout value together. Consequently, when they timed out, all of the timeouts on the 3-dimension list can be timed out and be serviced at the same time. When the 'just greater than' event is selected, since this is a link-list structure, a 'To-Be-Timeout' (TBT) value of the previous event can be read out through the previous event pointer and compared against the new event TBT value. If a match occurs, new event is to be inserted into this 3-dimension list.

Although described above with respect to a 'just greater than' characteristic, note that the mechanism should not be limited to 'just greater than' algorithm defined in the above paragraphs. In other embodiment, a 'just less than' may be used as well.

The above-described Universal Timeout Mechanism provides a cost effective solution for managing timeouts in complex timeout requirements across all different layers. In addition, the mechanism provides a method of timeout by only monitoring the to-be-timeout value at the head (e.g., the first event) of the link list which simplifies timeout management.

Further, the mechanism provides a centralized timeout processing method for easier timeout reporting/escalating, better reusability and more flexible expansion of new timeout requirements.

Further, by consolidating all different timers across all different layers into a single timeout timer provides a low cost solution of complex timeout requirements across all storage protocols.

Whereas many alterations and modifications will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims.

What is claimed is:

1. A system comprising:
a central timeout manager (CTM) to receive timeout events from two or more clients, the timeout events being associated with client events to be completed; and
a search unit to search for a location in a list of timeout events to place a new received timeout event;
wherein if a particular client event is completed prior to the occurrence of a particular timeout event associated with the particular client event, the particular timeout event is removed from the list.

2. The system of claim 1 wherein the CTM monitors only the event at the head of the list.

3. The system of claim 1 wherein each timeout event includes a request, a client ID and an absolute timeout value.

4. The system of claim 3 wherein the CTM includes a global timer.

5. The system of claim 4 wherein the CTM adds an absolute timeout value of the new event to a free running global time value and produces a sum comprising an expected timeout value.

6. The system of claim 5 wherein the search unit uses the sum to search the list to find out a relative order within the list for the new event.

7. The system of claim 6 wherein the search unit inserts the new event into the list.

8. The system of claim 7 wherein the CTM transmits an acknowledgement having a timeout ID to the client.

9. The system of claim 8 wherein a timeout occurs when the expected timeout value of the head of the list meets timeout criteria based on the value from the global counter.

10. The system of claim 1 wherein the list is a two-dimensional linked list.

11. The system of claim 1 wherein the list is a three-dimensional linked list.

12. The system of claim 11 wherein the search unit searches the three-dimensional linked list in parallel.

13. A method comprising:
receiving a new timeout event from a client, the timeout event being associated with a client event to be completed;
adding an absolute timeout value associated with the new timeout event to a free running global time value;

producing a sum comprising an expected timeout value;

searching a list using the sum to find out a relative order within the list for the new timeout event; and inserting the new timeout event into the list;

wherein if the client event is completed prior to the occurrence of the timeout event, the timeout event is removed from the list.

14. The method of claim 13 further comprising transmitting an acknowledgement to the client.

15. The method of claim 14 further comprising initiating a timeout when the new timeout event meets timeout criteria based on the free running global time value.

16. The method of claim 15 further comprising reporting the timeout to the client via recorded client ID after initiating the timeout.

17. The method of claim 16 further comprising removing the new timeout event from the list after reporting the timeout to the client.

18. A system comprising:

a central timeout manager (CTM) to receive timeout events from two or more clients, the timeout events being associated with client events to be completed;

a storage device having a plurality of cells to maintain a two-dimensional linked list of timeout events; and a search unit to search for a location in the linked list of timeout events to place a new received timeout event;

wherein if a particular client event is completed prior to the occurrence of a particular timeout event associated with the particular client event, the particular timeout event is removed from the list.

19. The system of claim 18 further comprising a set of registers associated with each column of the two-dimensional linked list to store an expected timeout value of a new event.

20. The system of claim 19 further comprising a set of comparators associated with each column of the two-dimensional linked list to compare the expected timeout value of a new event stored in each register to the timeout events in the two-dimensional linked list.

21. The system of claim 20 further comprising a bit finding mechanism to find a value in the linked list having a closest expected timeout value.

* * * * *